US012812759B2

(12) United States Patent
Lee et al.

(10) Patent No.: US 12,812,759 B2
(45) Date of Patent: Nov. 24, 2026

(54) MODULE FOR GENERATING HIGH-DENSITY PLASMA IN DIRECT TYPE

(71) Applicants: Sang Dae Lee, Suwon-si (KR); GMD Biotech, Inc., Gwangju (KR)

(72) Inventors: Sang Dae Lee, Suwon-si (KR); Jae Hoon Jung, Suwon-si (KR)

(73) Assignees: Sang Dae Lee, Suwon-si (KR); GMD Biotech, Inc., Gwangju (KR)

( * ) Notice: Subject to any disclaimer, the term of this patent is extended or adjusted under 35 U.S.C. 154(b) by 64 days.

(21) Appl. No.: 18/871,204

(22) PCT Filed: Jun. 2, 2023

(86) PCT No.: PCT/KR2023/007646
§ 371 (c)(1),
(2) Date: Dec. 3, 2024

(87) PCT Pub. No.: WO2023/234751
PCT Pub. Date: Dec. 7, 2023

(65) Prior Publication Data

US 2026/0113832 A1 Apr. 23, 2026

(30) Foreign Application Priority Data

Jun. 3, 2022 (KR) ........................ 10-2022-0068138

(51) Int. Cl.
*B01J 19/08* (2006.01)
*B01L 1/04* (2006.01)
(Continued)

(52) U.S. Cl.
CPC .................................... *H05H 1/471* (2021.05)

(58) Field of Classification Search
CPC .. A61L 9/22; A61L 2209/00; A61L 2209/212; A61L 2209/10
(Continued)

(56) References Cited

U.S. PATENT DOCUMENTS

2005/0174062 A1 8/2005 Tanaka et al.
2008/0047433 A1 2/2008 Ouyang et al.

FOREIGN PATENT DOCUMENTS

JP 8-131884 A 5/1996
JP 2007-289832 A 11/2007
(Continued)

OTHER PUBLICATIONS

"Notice Requesting Submission of Opinion" dated Dec. 26, 2023 for KR 10-2022-0068138.
(Continued)

*Primary Examiner* — Monzer R Chorbaji
(74) *Attorney, Agent, or Firm* — Sughrue Mion, PLLC

(57) ABSTRACT

The present invention provides a plasma generation module comprising: multiple needle-shaped discharge electrodes disposed in multiple cells arranged in the XY plane such that the peaks thereof are oriented in the Z-axis direction at the centers of the cells; ground electrodes formed on perimeters of the cells in one-to-one correspondence with the peaks in the XY plane at the same height as the peaks; a guide block on which the ground electrodes are seated and which has grooves into which the multiple needle-shaped discharge electrodes are inserted; and a first terminal electrically connected to multiple needle-shaped discharge electrodes, and a second terminal electrically connected to the ground electrodes. According to the present invention, it is possible to generate plasma in a multiphasic and uniform manner by using the discharge electrodes and the ground electrodes included in the multiple cells.

8 Claims, 6 Drawing Sheets

(51) Int. Cl.
*H05F 3/00* (2006.01)
*H05H 1/24* (2006.01)

(58) Field of Classification Search
USPC .................. 422/22, 186.04, 186.1; 204/164; 454/187
See application file for complete search history.

(56) References Cited

FOREIGN PATENT DOCUMENTS

| | | | | | |
|---|---|---|---|---|---|
| JP | 2011-115569 A | * | 6/2011 | ............... | A61L 9/22 |
| JP | 2012-139452 A | | 7/2012 | | |
| JP | 2016-195984 A | | 11/2016 | | |
| JP | 2017-123990 A | | 7/2017 | | |
| KR | 10-1065361 B1 | | 9/2011 | | |
| KR | 10-2016-0101407 A | | 8/2016 | | |
| KR | 10-1738079 B1 | | 5/2017 | | |
| KR | 10-2287838 B1 | | 8/2021 | | |

OTHER PUBLICATIONS

"Notice of Decision to Grant a Patent" dated Nov. 13, 2024 for KR 10-2022-0068138.
"Notice of Reasons for Rejection" dated Nov. 11, 2025 for JP 2024-571319.
"Notice Requesting Submission of Opinion" dated Jun. 18, 2024 for KR 10-2022-0068138.
"Decision to Grant a Patent" dated Mar. 17, 2026 for JP 2024-571319.

* cited by examiner

MODULE FOR GENERATING HIGH-DENSITY PLASMA IN DIRECT TYPE

CROSS-REFERENCE TO RELATED APPLICATIONS

This is a national stage of International Application No. PCT/KR2023/007646, filed Jun. 2, 2023, which claims the benefit of Korean Application No. 10-2022-0068138, filed Jun. 3, 2022, in the Korean Intellectual Property Office, the disclosures of which are incorporated herein by reference.

TECHNICAL FIELD

The present invention relates to a module for generating high density plasma in direct type, and more specifically, to a large-area plasma generation module.

BACKGROUND ART

A plasma generation device is a device that induces partial discharge by applying a high voltage ranging from several kilovolts (kV) to several thousand kilovolts to positive and negative electrodes. Plasma generation devices are typically installed in electronic appliances such as air purifiers or air conditioners. For example, an air purifier cleans indoor air by blowing positive (+) ions and negative (−) ions generated from the plasma generation device along with air, and an air conditioner equipped with a plasma generation device blows cold air along with positive and negative ions, thereby cooling and purifying the indoor space at the same time.

A piezoelectric transformer amplifies and outputs voltage, and when the amplified high voltage is applied to a needle-shaped electrode, plasma is generated in the surrounding space of the needle-shaped electrode. According to prior art, in order to sterilize a large space using a plasma generation module consisting of a pair of needle-shaped electrodes, multiple plasma modules were required, and there was an issue in which the amount of ozone generated increased in proportion to the number of plasma modules as multiple plasma modules were installed to maintain sterilization capability.

Additionally, according to prior art, the needle-shaped electrode portion of a small plasma module attached to the airflow path was smaller than the entire airflow area, that is, the active volume was small, so only the air was partially sterilized, leading to reduced sterilization efficiency.

As art related to the present invention, Korean Patent Publication discloses a plasma generation device which has a grid-shaped discharge structure comprising a first electrode plate and a second electrode plate. This technology relates to a structure in which the second electrode plate entirely encloses the first electrode plate, posing a risk of ozone generation, and the arrangement positions of the peaks of needle-shaped electrodes and the ground electrodes in this structure are different from those of the present invention. Thus, the configurations and effects of the two inventions are distinct from each other.

DETAILED DESCRIPTION OF THE INVENTION

Technical Problem

An object of the present invention is to provide a plasma generation module capable of generating plasma in a multiphasic manner using discharge electrodes and ground electrodes in multiple cell units.

Another object of the present invention is to provide a plasma generation module capable of reducing the likelihood of ozone generation through smooth air flow.

Another object of the present invention is to provide a high-density plasma generation module with high process convenience by using modularized electrodes.

The objects to be achieved by the present invention are not limited to the foregoing object, and additional objects, which are not mentioned herein, will be readily understood by those skilled in the art from the following description.

Technical Solution

A plasma generation module according to an embodiment of the present invention include: multiple needle-shaped discharge electrodes disposed in multiple cells arranged in the XY plane such that the peaks thereof are oriented in the Z-axis direction at the centers of the cells; ground electrodes formed on perimeters of the cells in one-to-one correspondence with the peaks in the XY plane at the same height as the peaks; a guide block on which the ground electrodes are seated and which has grooves into which the multiple needle-shaped discharge electrodes are inserted; and a first terminal electrically connected to multiple needle-shaped discharge electrodes, and a second terminal electrically connected to the ground electrodes.

The multiple needle-shaped discharge electrodes may be arranged such that the peaks thereof are oriented in a direction of air flow.

The multiple needle-shaped discharge electrodes may further include multiple electrode connectors configured to electrically interconnect the needle-shaped discharge electrodes in each row(m) or column (n) of the cell arrangement; and a cross connector configured to connect the multiple electrode connectors to one another, and the first terminal may be configured to be electrically connected to the cross connector.

The electrode connector may include fitting grooves formed at one end and the other end, and the cross-connector may be configured to be fitted into one of the fitting grooves.

The ground electrodes, which are connector, and may be configured in the shape of pad having electrode holes arranged in multiple rows m and columns n, each hole having a circular or polygonal shape that shares a common center with the peak of each needle-shaped discharge electrode.

The guide block may be configured to include tunnels arranged to correspond to the cells, with each tunnel having a cylindrical shape that shares a common center with the peak of the corresponding needle-shaped discharge electrode.

The guide block may be configured such that the diameter of the tunnel is largest at the bottom and gradually decreases as it approaches the ground electrode in the direction of air flow.

The plasma generation module may further include a top block configured to secure the ground electrodes on top of the guide block, wherein the top block may include an exhaust passage connected to the tunnel on the downstream side of the air flow, and the diameter of the exhaust passage may be formed to gradually increase in the direction of the air flow.

The top block may be configured such that the diameter of the exhaust passage at the height of the ground electrode is larger than the diameter of the electrode hole so as to allow a hole edge region of the ground electrode, which is in contact with the electrode hole, to be exposed in a viewing direction parallel to the Z-axis.

The plasma generation module may further include a bottom block disposed below the upper guide block, wherein the bottom block may include an inlet passage formed to connect with the tunnel from upstream of the air flow.

The details of other embodiments are incorporated in "Best Mode for Invention" and accompanying "Drawings."

The advantages and/or features of the present invention and a method of achieving the same will be apparently comprehended by referring to various embodiments described specifically hereinafter together with the accompanying drawings.

However, the following should be understood. The present invention is not limited to the configuration of each embodiment disclosed hereinafter but may also be implemented in various different forms. Each embodiment disclosed in this specification is provided to make the disclosure of the present invention complete, and to allow those skilled in the art to completely comprehend the scope of the present invention. The present invention is only defined within the scope of accompanying claims.

Advantageous Effects

According to the present invention, plasma can be generated in a multiphasic and uniform manner using the discharge electrodes and ground electrodes included in multiple cells.

In addition, the likelihood of ozone generation can be reduced through smooth air flow.

Furthermore, it is possible to enhance the process convenience of the plasma generation module by utilizing modularized electrodes.

BEST MODE FOR INVENTION

Figure 1:
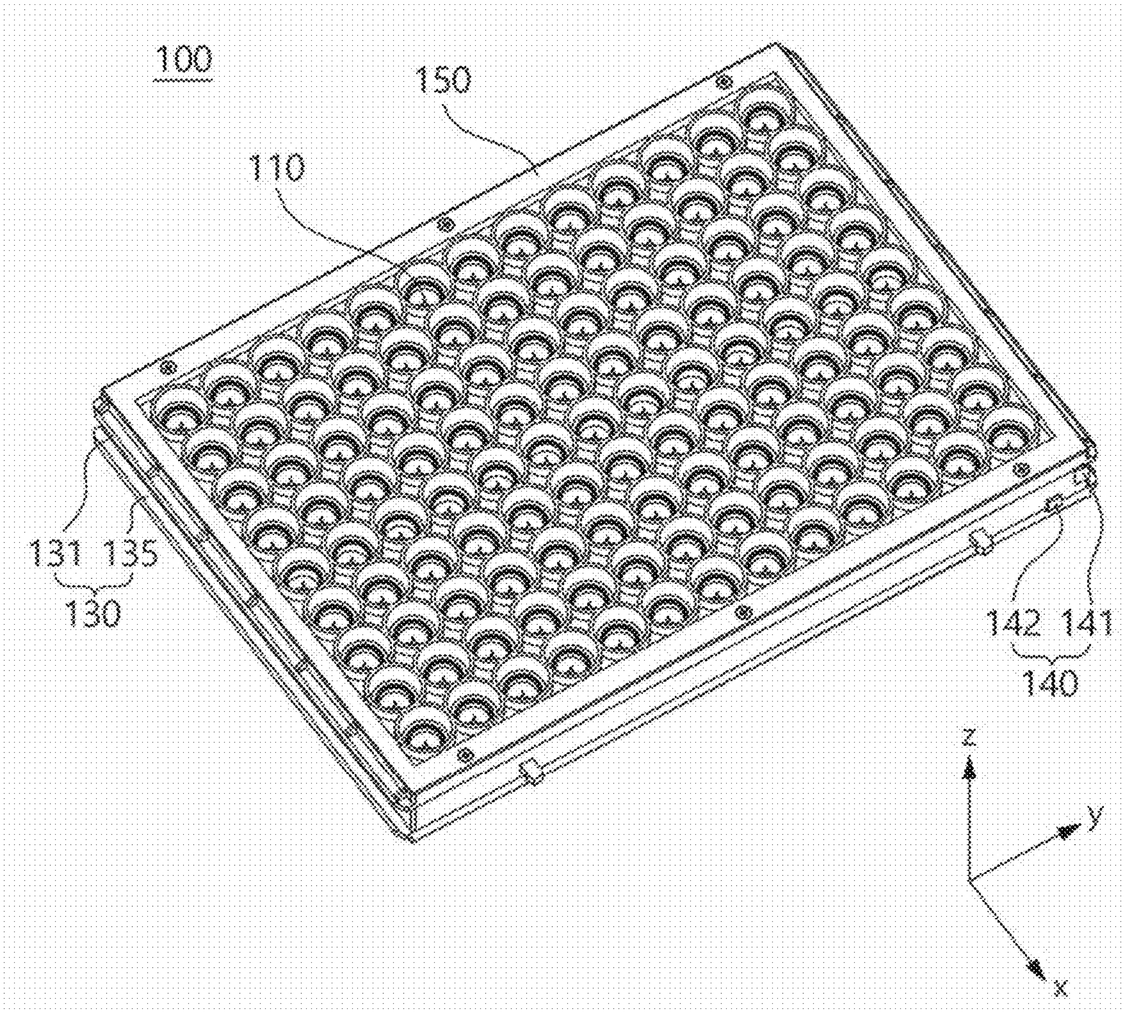
FIG. 1 is a perspective view of a plasma generation module according to one embodiment of the present invention.

Before describing the present invention in detail, terms and words used herein should not be construed as being unconditionally limited in a conventional or dictionary sense, and the inventor of the present invention can define and use concepts of various terms appropriately as needed in order to explain the present invention in the best way. Furthermore, it should be understood that these terms and words are to be construed in light of the meanings and concepts consistent with the technical idea of the present invention.

In other words, the terminology used herein is for the purpose of describing exemplary embodiments of the present invention, and is not intended to specifically limit the content of the present invention. It should be understood that these terms are defined terms in view of the various possibilities of the present invention.

Further, in this specification, the singular forms "a," "an," and "the" include plural referents unless the context clearly dictates otherwise. Also, it should be understood that the present invention can include a singular meaning even if it is similarly expressed in plural.

Where a component is referred to as "comprising" another component throughout this specification, unless specified otherwise, this means the component does not exclude any other element but may further include any other element.

Furthermore, when it is stated that an element is "inside or connected to another element," this element may be directly connected to another element or may be installed in contact with it. In addition, it may be installed spaced apart with a predetermined distance, and in the case where a component is installed to be spaced apart with a predetermined distance, a third component or means for fixing or connecting the component to another component may be present. Also, it should be noted that the description of the third component or means may be omitted.

On the other hand, it should be understood that there is no third component or means when an element is described as being "directly coupled" or "directly connected" to another element.

Likewise, other expressions that describe the relationship between the components, such as "between" and "right between," or "neighboring to" and "directly adjacent to" and such should be understood in the same spirit.

Further, in this specification, when terms such as "one surface," "other surface," "one side," "other side," "first," "second" and such are used, it is to clearly distinguish one component from another. It should be understood, however that the meaning of the component is not limited by such term.

It is also to be understood that terms related to positions such as "top," "bottom," "left," "right," and the like in this specification are used to indicate relative positions in the drawings for the respective components. Further, unless an absolute position is specified for these positions, it should not be understood that these position-related terms refer to absolute positions.

In addition, in this specification, the same reference numerals are used for the respective constituent elements of the drawings, and the same constituent elements are denoted by the same reference numerals even if they are shown in different drawings, that is, the same reference numerals indicate the same components throughout this specification.

It is to be understood that the size, position, coupling relationships and such, of each component constituting the present invention in the accompanying drawings, may be partially exaggerated or reduced or omitted to be able to sufficiently clearly convey the scope of the invention or for convenience of describing, and therefore the proportion or scale thereof may not be rigorous.

Also, in the following description of the present invention, a detailed description of a configuration that is considered to unnecessarily obscure the gist of the present invention, for example, a known technology including the prior art, may be omitted.

Hereinafter, embodiments of the present invention will be described in detail with reference to the relevant drawings.

A plasma generation module 100 according to one embodiment of the present invention corresponds to a module that includes electrodes generating atmospheric plasma and can form a plasma generation device together with a high-voltage generation device.

The length direction of the plasma generation module 100 is defined as the Y-axis, the width direction as the X-axis, and the height direction as the Z-axis.

FIG. 1 is a perspective view of a plasma generation module according to one embodiment of the present invention.

Figure 2:
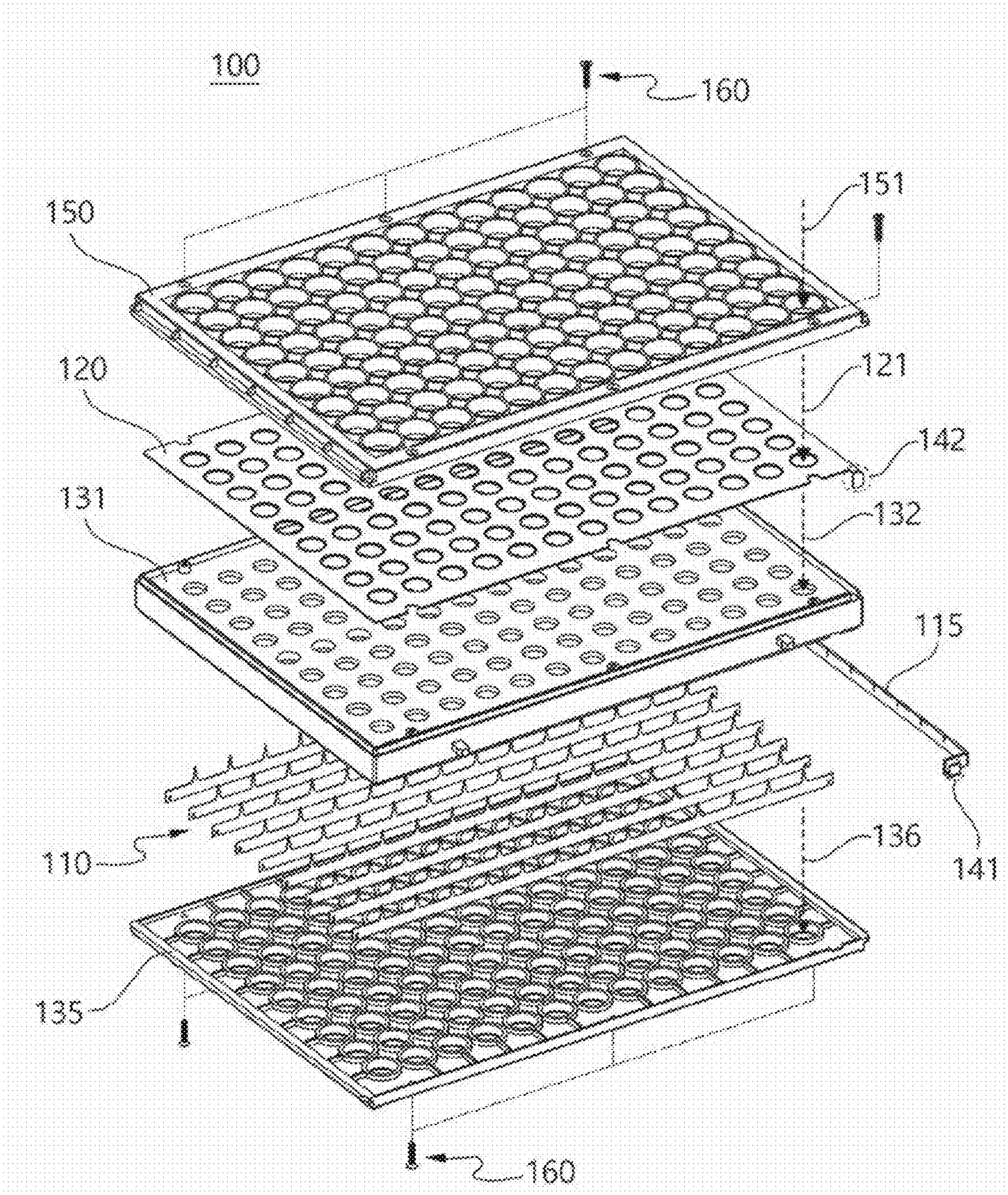
FIG. 2 is an exploded perspective view of a plasma generation module according to one embodiment of the present invention.

FIG. 2 is an exploded perspective view of a plasma generation module according to one embodiment of the present invention.

Referring to FIG. 1, the plasma generation module 100 may be configured to include multiple cells arranged in multiple rows m and columns n, for example, 13 rows and 9 columns as shown in FIG. 1, to generate large-area plasma.

While the cross-sectional shape of the cells is depicted as circular in FIG. 1, it is not limited to this shape and may be at least one of a circle, an ellipse, or a polygon. Referring to FIG. 2, similar to the cells, holes 151, 121, 132, and 136 formed in a top block 150, a ground electrode 120, an upper guide block 131, and a bottom block 135 may also have at least one shape among a circle, an ellipse, or a polygon.

Referring to FIG. 2, the hole formed in a top block 150 is referred to as an exhaust passage 151, the hole formed in the ground electrode 120 is referred to as an electrode hole 121, the hole formed in an upper guide block 131 is referred to as a tunnel 132, and the hole formed in a bottom block 135 is referred to as an inlet passage 136.

Referring back to FIGS. 1 and 2, the plasma generation module 100 may be configured to include needle-shaped discharge electrodes 110, the ground electrode 120, a guide block 130, a terminal 140, and the top block 150. The ground electrode 120, the guide block 130, and the top block 150 may be joined using coupling means 160, such as a screw.

The needle-shaped discharge electrodes 110 may be arranged in multiple cells arranged in the XY plane, with the peak 111*a* of each electrode oriented in the Z-axis direction at the center of each cell. Additionally, the multiple needle-shaped discharge electrodes 110 may be arranged such that their peaks are oriented in the direction of air flow. In other words, the needle-shaped discharge electrodes 110 may be arranged so that the needle-shaped peaks are directed downstream of the air flow at the center of each cell. This arrangement is intended to minimize airflow resistance. If air does not circulate smoothly, that is, if air stagnates around the needle-shaped discharge electrodes 110, the likelihood of ozone generation may increase.

The multiple needle-shaped discharge electrodes 110 may be electrically connected to a high-voltage generation device (not shown) via a first terminal 141. The method of connecting the multiple needle-shaped discharge electrodes 110 will be described further below.

The ground electrode 120, which is conductor, and may be configured in the shape of a pad having electrode holes 121 arranged in multiple rows m and columns n, each hole 121 having a circular or polygonal shape that shares a common center with the peak of each needle-shaped discharge electrode 110. Referring again to FIG. 2, the multiple ground electrodes 120 may be implemented as a single connected ground pad. The ground electrodes 120 may be completed by forming the electrode holes 121 aligned with the rows and columns in a plate-shaped conductor. The multiple electrode holes 121 may have at least one of a circular shape or a polygonal shape.

The ground electrodes 120 may be formed on the perimeters of the cells in one-to-one correspondence with the peaks of the needle-shaped discharge electrodes 110 in the XY plane at the same height as the peaks. Details on the height of the ground electrodes 120 will be described below.

The guide block 130 serves to secure the needle-shaped discharge electrodes 110 and the ground electrodes 120. Specifically, the ground electrodes 120 may be seated on the upper part of the guide block 130. Additionally, the multiple needle-shaped discharge electrodes 110 may be inserted into grooves formed in the guide block 130. The multiple needle-shaped discharge electrodes 110 may be fixed in the grooves of the guide block 130 either individually or grouped together. Details regarding the shape of the needle-shaped discharge electrodes 110 will be described below.

Referring to FIG. 2, the guide block 130 may be configured to include tunnels 132 arranged to correspond to the cells, with each tunnel 132 having a cylindrical shape that shares a common center with the peak of the corresponding needle-shaped discharge electrode 110. Details regarding the tunnels 132 will be described below.

The guide block 130 may consist of a single piece or two pieces depending on the direction in which the needle-shaped discharge electrodes 110 are inserted. For example, if the needle-shaped discharge electrodes 110 are inserted into the grooves formed on the upper part of the guide block 130, the guide block 130 may consist of a single piece. In this case, the upper part of the guide block 130 may be covered by the top block 150. If the grooves into which the needle-shaped discharge electrodes 110 are formed in the lower part of the guide block 130, a bottom block 135 is required to cover the lower part.

That is, the guide block 130 may be configured to include an upper guide block 131 positioned below the ground electrode 120 and the bottom block 135 positioned below the upper guide block 131. The tunnels formed in the bottom block 135 correspond to inlet passages 136 through which air flows in from upstream of the airflow.

Referring to FIG. 2, the terminal 140 may be configured to include the first terminal 141 electrically connected to the multiple needle-shaped discharge electrodes 110 and a second terminal 142 electrically connected to the ground electrodes 120. It is preferable that the terminal 140 is formed as a single pair, as shown in FIG. 2, rather than being individually formed for each electrode. Accordingly, there may be a medium between the electrodes and the terminal to facilitate electrical connection.

Referring again to FIG. 2, the plasma generation module 100 may be configured to include the top block 150 that secures the ground electrodes 120 on top of the guide block 130. The ground electrodes 120 may be positioned between the top block 150 and the upper guide block 131.

The top block 150 may be configured to include an exhaust passage 151 connected to the tunnel 132 on the downstream side of the air flow. Additionally, the diameter of the exhaust passage 151 may be formed to gradually increase in the direction of the air flow. Details regarding the diameter of the exhaust passage 151 will be described below.

Figure 3:
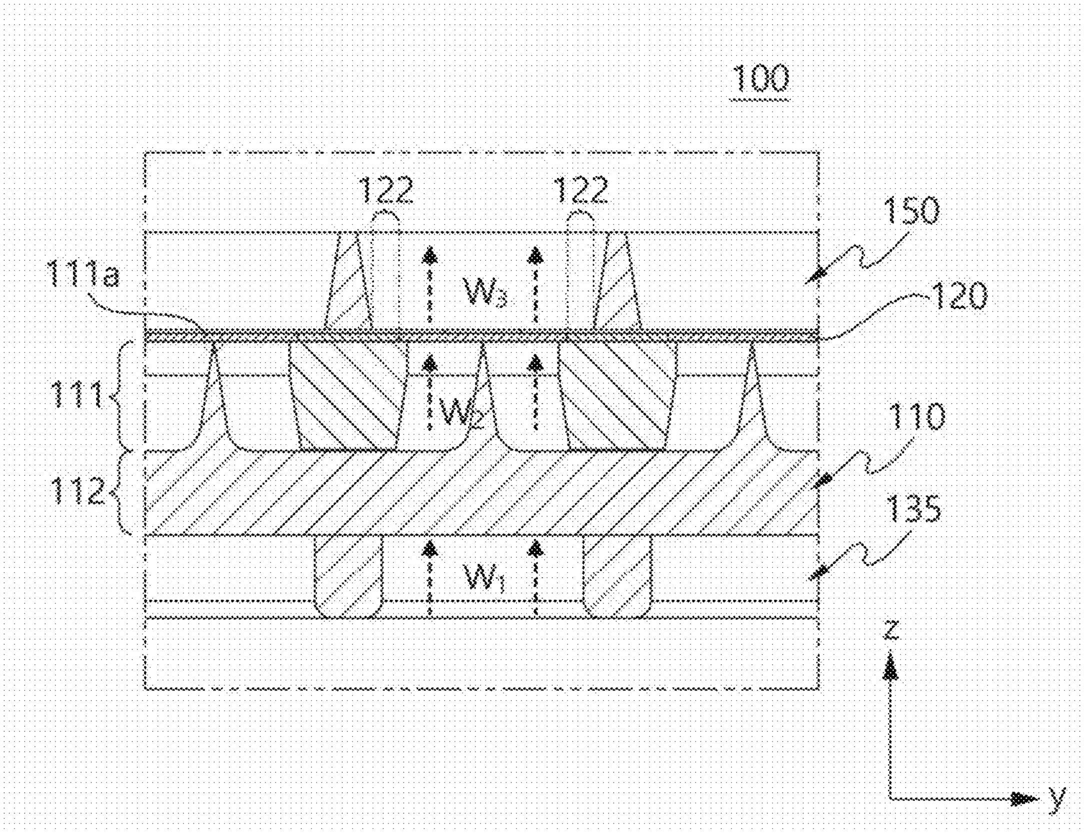
FIG. 3 is an example diagram illustrating a cross-section view of the plasma generation module of FIG. 1 parallel to the Y-axis.

FIG. 3 is an example diagram illustrating a cross-section view of the plasma generation module of FIG. 1 parallel to the Y-axis. Referring to FIG. 3, a cross section of the plasma generation module 100 in the length direction is depicted, as formed by bisecting a needle-shaped discharge electrode 111. The multiple needle-shaped discharge electrodes 110 may be configured to include individual needle-shaped discharge electrodes 111 and an electrode connector 112.

Figure 4:
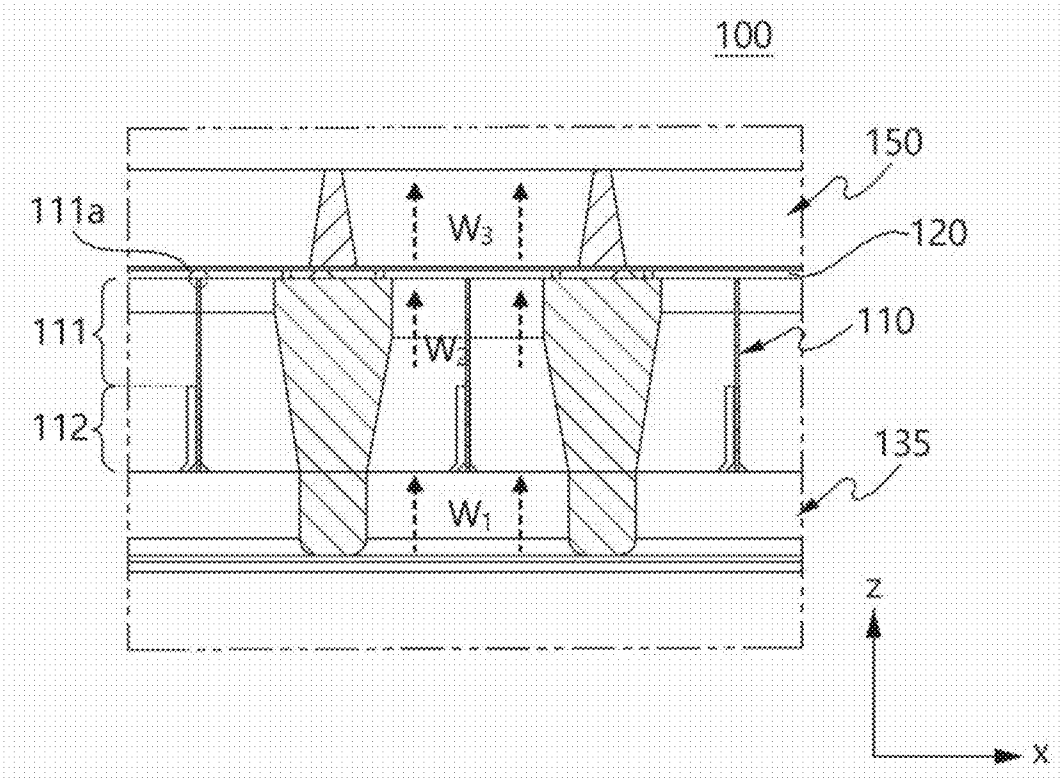
FIG. 4 is an example diagram illustrating a cross section of the plasma generation module of FIG. 1 parallel to the X-axis.

FIG. 4 is an example diagram illustrating a cross section of the plasma generation module of FIG. 1 parallel to the X-axis. Referring to FIG. 4, a cross section of the plasma generation module 100 in the width direction is depicted, as formed by bisecting the peak 111*a* of the needle-shaped discharge electrode 111. W1 to W3 represent air flows.

Referring to FIGS. 3 and 4, W1 to W3 represent the air flows. Looking along the Z-axis direction, the top block 150 is positioned at the top and the ground electrode 120 placed in contact with the top block 150. Below the ground electrode 120, the upper guide block 131 and the bottom block 135 are sequentially arranged.

W1 represents the air flow in the inlet passage 136, W2 represents the air flow in the tunnel 132, and W3 represents the air flow in the exhaust passage 151.

The guide block 130 may be configured such that the diameter of the tunnel 132 is largest at the bottom and gradually decreases as it approaches the ground electrode 120 in the direction of the air flow. According to Bernoulli's principle, the speed of a fluid is inversely proportional to the cross-sectional area. Therefore, as the diameter of the tunnel 126 gradually narrows along the direction of the air flow, the speed of the air flow within the tunnel 126 increases, enabling smooth air discharge.

Referring again to FIGS. 3 and 4, the ground electrodes 120 may be formed on the XY plane at the same height as the peaks 111*a* of the needle-shaped discharge electrodes 110, and it may be arranged on the perimeters of the cells in one-to-one correspondence with the peaks 111*a*. Specifically, the electrode hole 121 formed in the ground electrode 120 may be at the same height as the peak 111*a* of the needle-shaped discharge electrode 110. That is, the peaks 111*a* of the needle-shaped discharge electrodes 111 may be positioned between the upper and lower surfaces of the pad forming the ground electrode 120. The positions and shapes of the needle-shaped discharge electrodes 111 and the ground electrodes 120 are related to plasma parameters.

Figure 5:
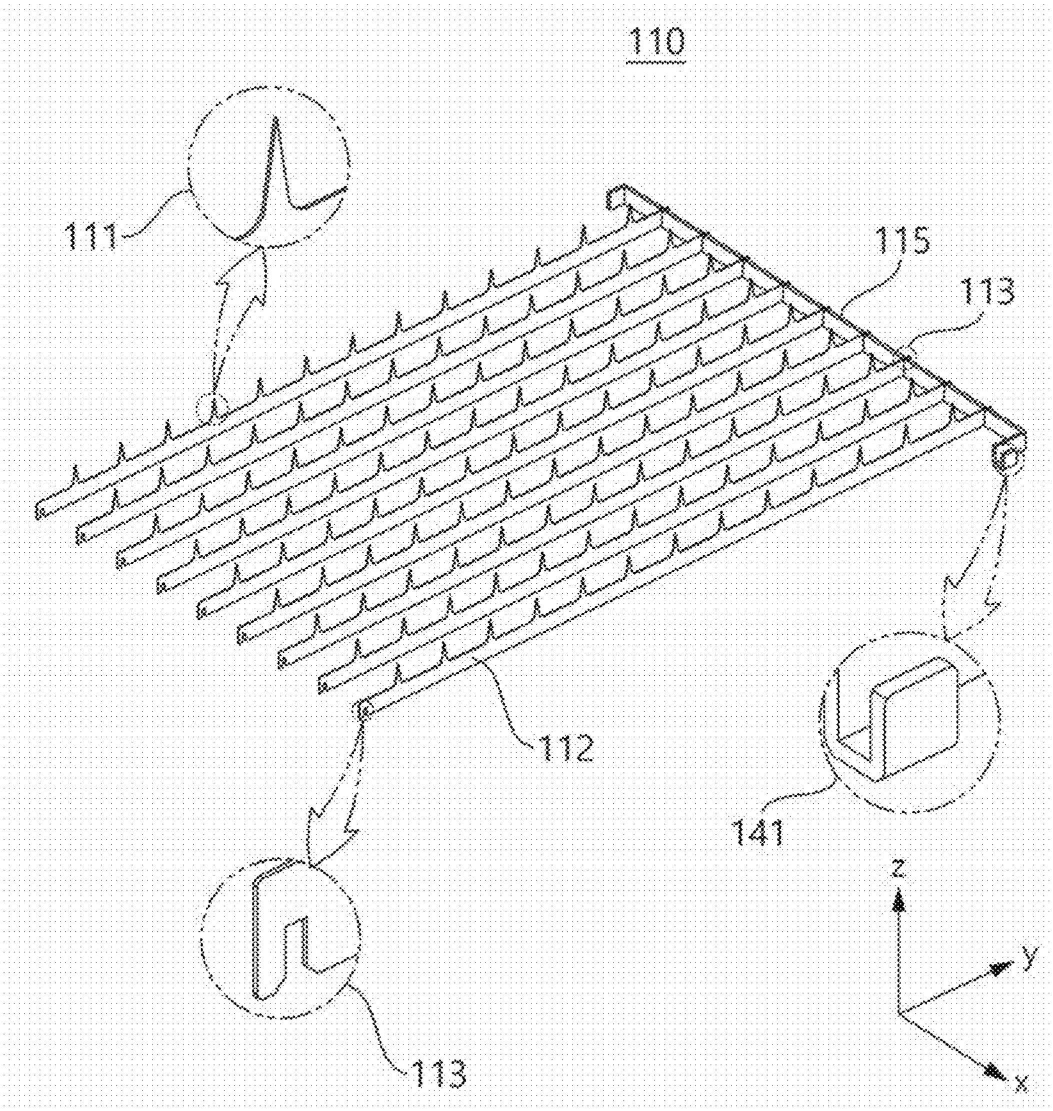
FIG. 5 is an example diagram of multiple needle-shaped discharge electrodes in the plasma generation module of FIG. 1.

FIG. 5 is an example diagram of multiple needle-shaped discharge electrodes in the plasma generation module of FIG. 1.

Referring to FIG. 5, the multiple needle-shaped discharge electrodes 110 may be configured to include multiple electrode connectors 112 configured to electrically interconnect the needle-shaped discharge electrodes 111 within each row m or column n directions, as well as a cross connector 115 configured to interconnect the multiple electrode connectors 112.

The electrode connector 112 may be configured to include fitting grooves 113 formed at one end and the other end. In addition, one of the fitting grooves 113 may be configured to allow the cross connector 115 to fit into it. The fitting grooves 113 may be provided at both ends to facilitate assembly during the manufacturing process.

The first terminal 141 may be configured to be electrically connected to the cross connector 115. In addition, the second terminal 142 may be configured to be electrically connected to the ground electrode 120.

Figure 6:
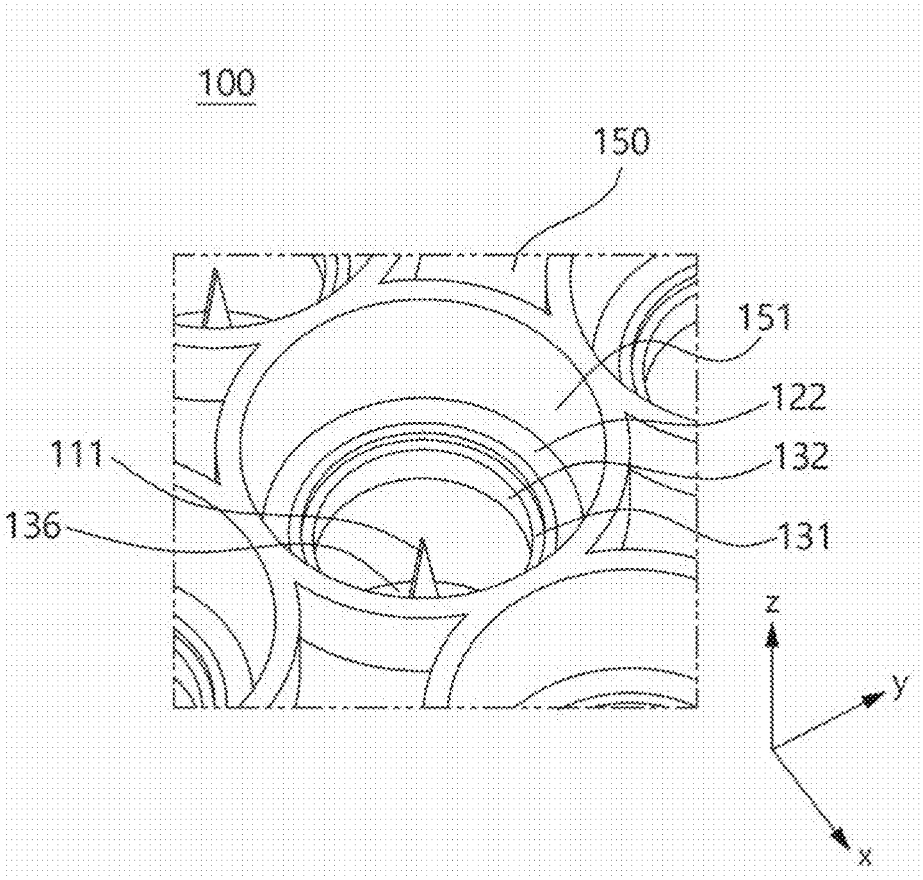
FIG. 6 is an example diagram illustrating a hole edge on the ground electrode in the plasma generation module of FIG. 1.

FIG. 6 is an example diagram illustrating a hole edge on the ground electrode in the plasma generation module of FIG. 1. Referring to FIG. 6, the top block 150 may be configured such that the diameter of the exhaust passage 151 at the height of the ground electrode is larger than the diameter of the electrode hole 121 so as to allow the region of a hole edge 121 of the ground electrode 120, which is in contact with the electrode hole 121, to be exposed in the viewing direction parallel to the Z-axis. That is, the hole edge 122 of the grounding electrode 120 is exposed between the upper guide block 131 and the exhaust passage 151 of the top block 150, i.e., between vertical wall surfaces. More specifically, the horizontal hole edge 122 and the vertical wall corresponding to the thickness of the ground electrode 120 are exposed to air, and these areas are related to discharge in relation to the individual needle-shaped discharge electrodes 111.

As described above, according to one embodiment of the present invention, plasma can be generated in a multiphasic and uniform manner using the discharge electrodes and ground electrodes included in multiple cells. In addition, the likelihood of ozone generation can be reduced through smooth air flow. Furthermore, it is possible to enhance the process convenience of the plasma generation module by utilizing modularized electrodes.

The exemplary embodiments of the present invention have been described above. It should be understood by one of ordinary skill in the art that the present invention may be implemented as a modified form without departing from the essential features of the present invention. Therefore, the disclosed embodiments should be considered in a descriptive sense only and not for purposes of limitation. The scope of the present invention will be shown in the utility model registration claims not in the above description, and all differences within an equivalent scope thereof should be construed as being included in the present invention.

INDUSTRIAL APPLICABILITY

The present invention can be efficiently applied in the field of manufacturing a plasma generation module.

The invention claimed is:

1. A plasma generation module comprising:

multiple needle-shaped discharge electrodes disposed in multiple cells arranged in an XY plane such that the peaks thereof are oriented in a Z-axis direction at the centers of the cells;

a conductive ground pad having electrode holes arranged in multiple rows and columns, each electrode hole having a circular or polygonal shape that shares a common center with a peak of a corresponding needle-shaped discharge electrode, the ground pad being seated on a top surface of a guide block such that each electrode hole is positioned at a same height as the corresponding peak;

the guide block having grooves into which the multiple needle-shaped discharge electrodes are inserted, and comprising cylindrical tunnels arranged in one-to-one correspondence with the cells, each cylindrical tunnel sharing a common center with the peak of the corresponding needle-shaped discharge electrode, wherein a diameter of each cylindrical tunnel is largest at a bottom of the guide block and gradually decreases toward the ground pad in a direction of air flow; and a first terminal electrically connected to the multiple needle-shaped discharge electrodes, and a second terminal electrically connected to the ground pad, wherein the multiple needle-shaped discharge electrodes are fixed in the grooves of the guide block individually or in groups.

2. The plasma generation module of claim 1, wherein the multiple needle-shaped discharge electrodes are arranged such that the peaks thereof are oriented in a direction of air flow.

3. The plasma generation module of claim 1, wherein the multiple needle-shaped discharge electrodes further comprise multiple electrode connectors configured to electrically interconnect the needle-shaped discharge electrodes in each row (m) or column (n) of the cell arrangement; and a cross-connector configured to connect the multiple electrode connectors to one another, wherein the first terminal is configured to be electrically connected to the cross-connector.

4. The plasma generation module of claim 3, wherein the electrode connector comprises fitting grooves formed at one end and the other end, and one of the fitting grooves is configured to allow the cross connector to fit into it.

5. The plasma generation module of claim 1, wherein the ground pad is a single connected conductive pad in which the electrode holes are formed.

6. The plasma generation module of claim 1, further comprising a top block configured to secure the ground pad on top of the guide block, wherein the top block comprises an exhaust passage connected to the cylindrical tunnel on a downstream side of the air flow, and a diameter of the exhaust passage gradually increases in the direction of the air flow.

7. The plasma generation module of claim 6, wherein the top block is configured such that a diameter of the exhaust passage at a height of the ground pad is larger than a diameter of the electrode hole, so as to expose a hole edge region of the ground pad adjacent the electrode hole in a viewing direction parallel to the Z-axis.

8. The plasma generation module of claim 1, wherein the guide block comprises an upper guide block positioned below the ground pad; and a bottom block positioned below the upper guide block, and wherein tunnels formed in the bottom block correspond to inlet passages through which air flows in from upstream of the air flow.

* * * * *